(12) United States Patent
Frechette et al.

(10) Patent No.: US 6,302,673 B1
(45) Date of Patent: Oct. 16, 2001

(54) INTEGRATED CIRCUIT CHIP MOLD SEAL

(75) Inventors: Raymond A. Frechette, North Providence; Daniel S. Troiano, Cumberland, both of RI (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/685,037

(22) Filed: Oct. 10, 2000

Related U.S. Application Data

(62) Division of application No. 09/281,278, filed on Mar. 30, 1999, which is a division of application No. 08/991,127, filed on Dec. 16, 1997, now Pat. No. 5,942,178.
(60) Provisional application No. 60/033,460, filed on Dec. 17, 1956.

(51) Int. Cl.$^7$ .............................. B29C 33/12; B29C 45/14
(52) U.S. Cl. ..................... 425/123; 425/129.1; 425/544; 425/DIG. 44
(58) Field of Search ..................... 264/272.15, 272.17, 264/328.9; 425/116, 121, 123, 129.1, 544, DIG. 44

(56) References Cited

U.S. PATENT DOCUMENTS

| | | | |
|---|---|---|---|
| 4,236,689 | * | 12/1980 | Hass ................................. 425/116 |
| 4,480,975 | * | 11/1984 | Plummer et al. ..................... 425/116 |
| 5,118,271 | * | 6/1992 | Baird et al. ........................ 425/116 |
| 5,496,435 | * | 3/1996 | Abbott ............................ 264/272.15 |

FOREIGN PATENT DOCUMENTS 55-118640 * 9/1980 (JP) .................................. 264/272.17

* cited by examiner

*Primary Examiner*—Robert Davis
(74) *Attorney, Agent, or Firm*—Wade James Brady, III; Frederick J. Telecky, Jr.

(57) ABSTRACT

A gasket is provided as a substitute for metal dambars during a process of encapsulating an integrated circuit chip package. The gasket can be in the form of a straight strip for sealing one side of the lead frame or a structure which corresponds in shape and dimension to the entire perimeter of the lead frame. The gasket has grooves formed therein which are defined by projections between adjacent grooves. The depth of each groove is slightly greater than a thickness of the leads. When the gasket is compressed prior to injection of an encapsulation material, the gasket material deforms such that the projections sealingly fill the spaces between leads and the cross-sectional shape of each groove is substantially the same as the cross-sectional shape of the respective lead disposed within the groove.

12 Claims, 3 Drawing Sheets

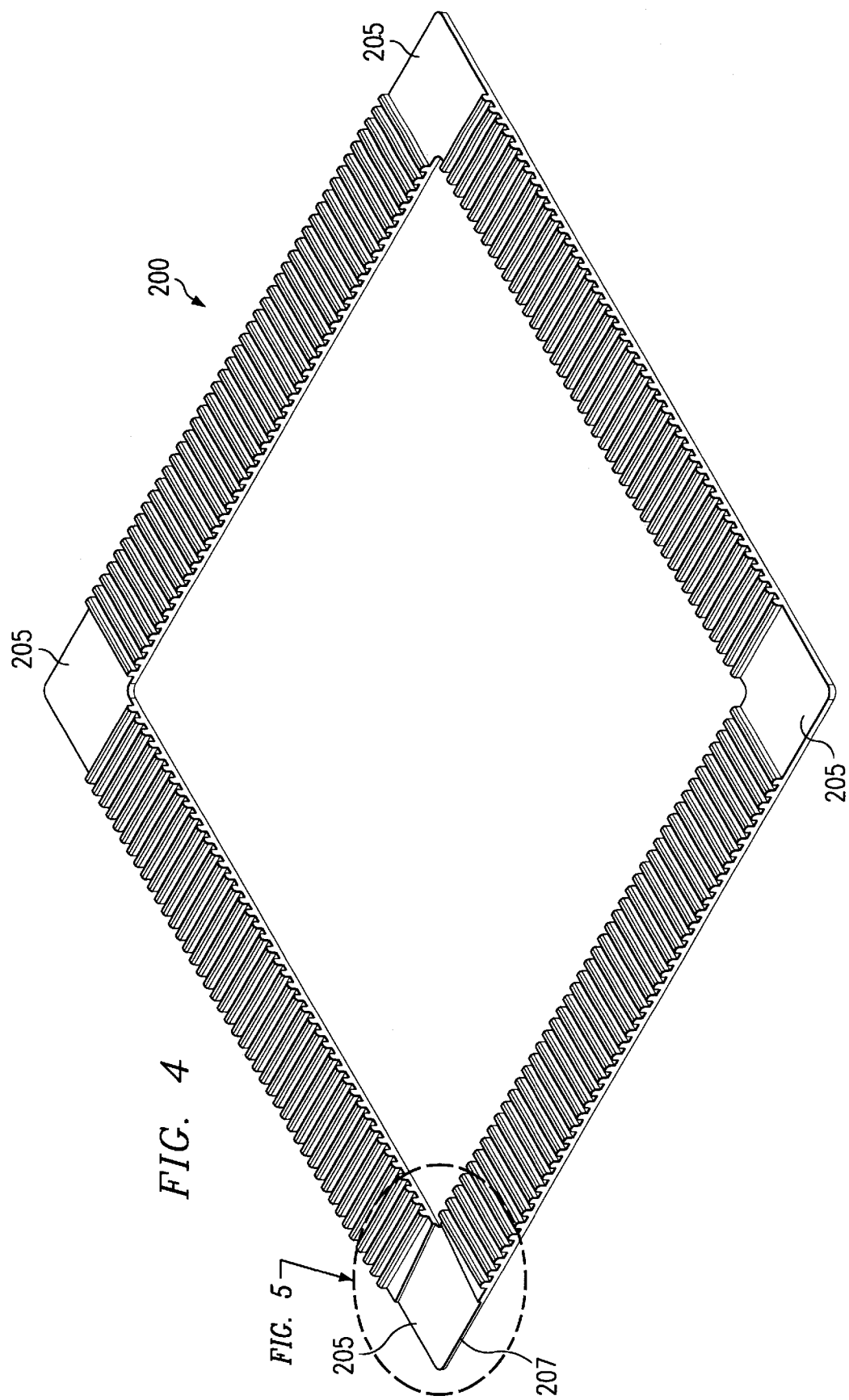

INTEGRATED CIRCUIT CHIP MOLD SEAL

CROSS REFERENCE TO PRIOR APPLICATIONS

This application is a division of Ser. No. 09/281,278, filed Mar. 30, 1999, which is a division of Ser. No. 08/991,127, filed Dec. 16, 1997 and now U.S. Pat. No. 5,942,178 which claims priority under 35 U.S.C. 119(e)(1) of Provisional Application Ser. No. 60/033,460, filed Dec. 17, 1996.

TECHNICAL FIELD OF THE INVENTION

The present invention generally relates to integrated circuit chip manufacturing and, more particularly, to an integrated circuit chip mold seal.

BACKGROUND OF THE INVENTION

Integrated circuit chip packages are typically formed by mounting an integrated circuit chip on a lead frame and coupling these two elements to form a package. The package may be encapsulated by, for example, injection molding the empty spaces of the internal area of the lead frame.

Different techniques have been used to prevent the mold material from leaving the internal area of a lead frame and moving to the external area during the encapsulation process. One approach has been the use of metal dambars. A lead frame may be a stamped metal structure including individual leads having internal, intermediate and external portions. The metal dambars constitute portions of the lead frame structure which join the intermediate portions of the individual leads.

According to a typical encapsulation process, a mold cavity is formed by sandwiching the lead frame between plates. The metal dambars provide a boundary to prevent the mold material from traveling to the external area of the lead frame and among the external portions of the leads. After the encapsulation process, the metal dambars are removed to electrically isolate the leads from one another. This may be accomplished by a precision stamping tool which mechanically cuts the dambars from between each individual lead. This is a time consuming and expensive process. Also, over time, lead frames are being made smaller and smaller and pin count is increasing. The lead frames are incorporating greater numbers of more narrow leads and the distance between leads is being reduced. Thus, greater precision is required to remove the dambars.

An alternative to using dambars is to fill the spaces between leads with an organic tape or paste. An organic material in liquid form may be dispensed along the intermediate portions of the leads to fill the spaces between the leads. The material may then be hardened by polymerization. This may be accomplished, for example, by ultraviolet radiation. One of the drawbacks to this process is that the application of the material is tedious and time consuming, and uniformity in application is virtually impossible. After the encapsulation process, the organic material may be left in place because it is a dielectric. However, typical materials used in this approach are generally not compatible with the service environment of the electronic device incorporating the package. For example, temperature cycling, vibration, exposure to gases, condensation and the like can cause the material to deteriorate. This can result in leakage and poor electrical isolation among the leads. Therefore, it is often desirable to remove the material. As with metal dambars, the removal process is expensive and time consuming, and requires precision instruments.

Another alternative to metal dambars is the application of a thermoplastic tape or a plastic preform to the lead frame. One or more sheets of tape or a plastic preform may be pressed against the leads while being heated. Heating causes the tape or preform to melt onto and between the leads. This approach has disadvantages similar to those described above in connection with using organic tape.

Another alternative to metal dambars is the use of two plastic film "linings" for the upper and lower halves of the mold cavity. The two films line the mold cavity and are drawn by a vacuum so that they are contoured to a surface of the cavity. At an intermediate temperature during the encapsulation process, the film flows into the spaces between leads to create a seal about the perimeter of the lead frame. After the encapsulation material is injected, the film may be stripped away and advanced to line and seal a mold cavity of a subsequent lead frame. This process is relatively costly, however, and requires special tools and equipment.

Other problems, shortcomings and disadvantages of known integrated circuit chip package encapsulation techniques and the elimination of metal dambars will be readily apparent to those having ordinary skill in the relevant art.

SUMMARY OF THE INVENTION

It is an object of the present invention to overcome the problems associated with known techniques for encapsulating integrated circuit chip packages.

It is another object of the present invention to provide an inexpensive and easy-to-use device for preventing fluid flow among the leads of a lead frame and between a mold cavity and its exterior during a process of encapsulating an integrated circuit chip package.

It is another object of the present invention to provide a simple encapsulation gasket which may be used with several different types of lead frames.

It is another object of the present invention to provide a system for encapsulating an integrated circuit chip package. The system includes a simple dam which may be easily removed after the encapsulation process.

It is another object of the present invention to provide a method of encapsulating an integrated circuit chip package which will save time and money over known encapsulation processes.

To accomplish these and other objects of the present invention, and in accordance with a first embodiment of the present invention, a gasket is provided for use in encapsulating an integrated circuit chip package. The package includes a lead frame having at least one lead. The gasket includes at least one preformed strip having at least one groove formed in a surface thereof. The at least one groove corresponds to the at least one lead.

When the gasket is in a non-compressed state, the at least one groove may have a depth slightly greater than a thickness of the at least one lead and a width slightly greater than a width of the at least one lead. When the gasket is in a compressed state, the at least one groove may have a depth and a width substantially equal to a thickness and a width, respectively, of the at least one lead. The lead frame may include a plurality of leads. When the strip is coupled to the lead frame and is in a compressed state, the strip may prevent a fluid from flowing between at least two of the plurality of leads.

According to an alternative aspect of the first embodiment, the strip is in the form of a continuous straight strip which may be cut into lengths equal to the lengths of sides of the lead frame. According to another alternative aspect, the gasket has a shape and dimensions corresponding to a shape and dimensions of the lead frame.

According to a second embodiment of the present invention, a system is provided for encapsulating an integrated circuit chip package having a lead frame having at least one lead. The system includes a first plate and a second plate spaced from the first plate. The lead frame is adapted to be sealingly disposed between the first and second plates to form a mold cavity. A gasket is provided which is adapted to be coupled to the lead frame to form a portion of a boundary of the mold cavity. The gasket includes a strip having a least one groove for receiving the at least one lead therein.

According to a third embodiment of the present invention, a method of encapsulating an integrated circuit chip package is provided. The package has a lead frame with at least one lead. According to the method, a gasket is preformed. The gasket is coupled to the lead frame. The lead frame and gasket are positioned between two plates to form a mold cavity. An encapsulation material is injected into the mold cavity. The method may also include the step of compressing the gasket such that the gasket material sealingly fills the space between at least two leads and the cross-sectional shape of the groove is substantially the same as the cross-sectional shape of the at least one lead.

Other features, aspects and advantages of the present invention will be understood by those having ordinary skill in the relevant art by reference to the detailed description in connection with the appropriate figures.

BRIEF DESCRIPTION OF THE DRAWINGS

For a more complete understanding of the present invention and for further features and advantages, reference is now made to the following description taken in conjunction with the accompanying drawings, in which:

FIG. 4 is an isometric view of a gasket according to a second alternative aspect of the first embodiment of the present invention.

DETAILED DESCRIPTION OF THE INVENTION

Generally, the present invention provides a gasket for sealing the spaces between the leads of a lead frame during a process of encapsulating an integrated circuit chip package. The gasket can be in the form of a continuous, straight strip which may be provided, for example, as a roll of gasket material. Alternatively, the gasket can conform to the dimensions of a given type of lead frame. For instance, a gasket for a rectangular lead frame may have a corresponding rectangular shape. The gasket can be part of a system for encapsulating the package. Also, a method of using the gasket for encapsulation is provided.

In accordance with a first embodiment of the present invention, a gasket is provided for use during a process of encapsulating an integrated circuit chip package. The gasket includes grooves formed in a surface thereof for receiving the individual leads of a lead frame. By altering the pitch and size of grooves in the gasket, the gasket may be used with any integrated circuit chip package. The integrated circuit chip package may include a lead frame and an integrated circuit chip mounted within the lead frame. The lead frame may be any type of lead frame used in forming such packages and may have a number of leads spaced about the sides of the lead frame. The leads may have interior, intermediate and external portions. The internal portions are those portions which are located within a mold cavity during encapsulation. The intermediate portions are those portions which are coextensive with an encapsulation dam. The exterior portions are those portions which extend outwardly from the dam area. Bond pads of the chip may be wire bonded to the leads. During encapsulation, as described in greater detail below, the lead frame may be sandwiched between two plates to form a mold cavity having the plates and the intermediate portions of the leads as boundaries. A molding material is injected into the mold cavity. The gasket serves as the encapsulation dam and generally replaces the metal dambars used in known encapsulation processes.

Figure 1:
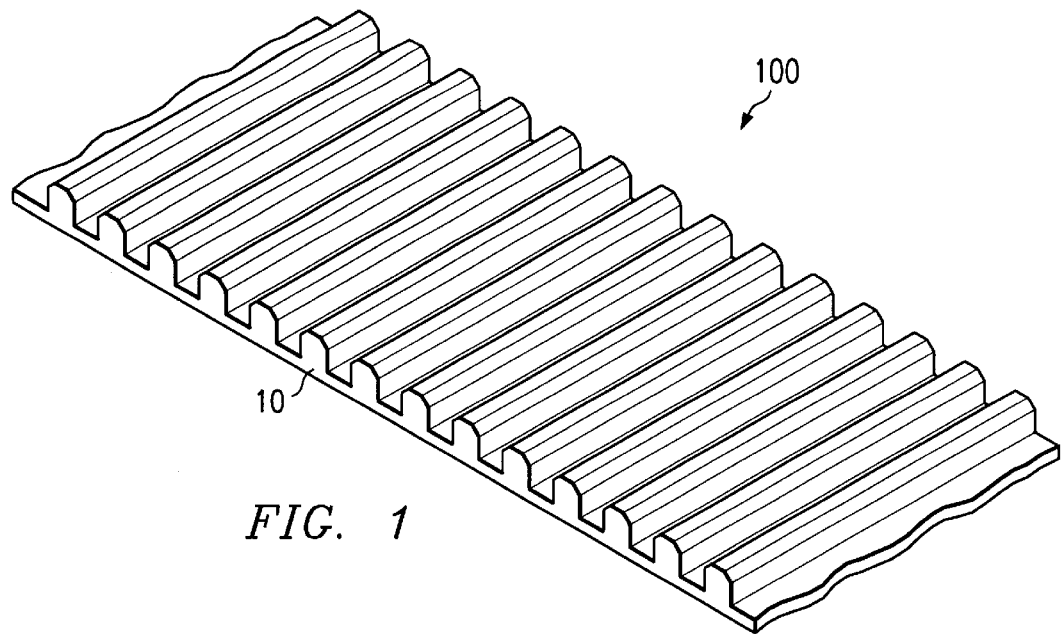
FIG. 1 is an isometric view of a gasket according to a first aspect of a first embodiment of the present invention.

The gasket may be provided in different forms. According to one aspect, as shown in FIG. 1, a gasket 100 is provided in the form of a strip of gasket material. Preferably, the gasket is preformed in a separate process to have grooves as discussed in detail below. For example, the gasket may be formed by an injection molding process, or cast in a suitably configured mold. Alternatively, the gasket may be forged. According to this aspect, a portion of gasket material may be provided without grooves. The grooves may be forged by applying a heating element to the gasket material with an appropriate predetermined pressure to forge the grooves. The heating element thus has projections which correspond in shape to the desired grooves.

The gasket material may be any suitable material. It is preferable that the gasket material is sufficiently rigid such that the grooves snap onto the leads of the lead frame. However, the material should also be deformable so that when the gasket is compressed (e.g., between two encapsulation plates) the material between the grooves will completely and sealingly fill the spaces between the leads.

Therefore, gasket 100 includes a base portion 102 which is rectangular and planar in shape. Preferably, a width of the gasket 100 corresponds to a predetermined length of the intermediate portions of the leads. This dimension may be varied depending upon the particular application. Among the factors affecting this dimension is the necessity that the width be sufficiently large so that the material between the leads can withstand the pressure created during the encapsulation process. Another factor is the rigidity and strength of the material used for the gasket.

Figure 2:
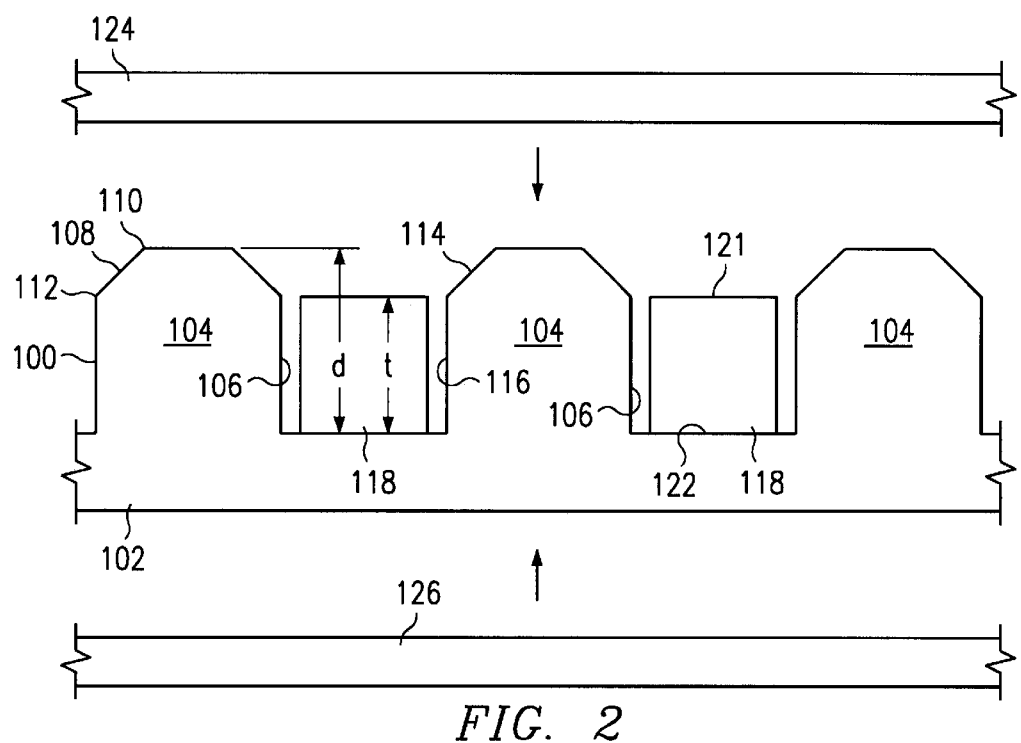
FIG. 2 is an enlarged partial view of the gasket of FIG. 1 in an uncompressed state.

FIG. 2 is an enlarged view of a portion of gasket 100 coupled to leads 118 of a lead frame. With further reference to FIG. 2, the base portion 102 is integral with a plurality of projections 104 which define one or more respective grooves 106 therebetween. Each projection 104 has a tapered portion 108. The tapered portion 108 is formed by tapering the projection 104 from a first smaller width to a second larger width in a direction toward base 102 from a first end 110 to a second end 112. Preferably, the angle of the taper is on the order of about forty-five degrees. The projection 104 also includes a pair of substantially parallel side walls 114 extending from tapered portion 108 to base portion 102. Preferably, these elements are integrally formed.

Each groove 106 thus has a flared portion 104 and a channel portion 116. An overall depth "d" of groove 106 is preferably slightly greater than the corresponding thickness "t" of a lead 118 of the lead frame. This configuration allows gasket 100 to be compressed when the integrated circuit chip package is sandwiched between two plates during an encapsulation process. For example, the ratio of depth "d" to thickness "t" may be on the order of about 1.2:1. In the uncompressed state, the groove 106 may be slightly wider than the lead 118. For example a ratio of the width of groove 106 to the width of lead 118 may be on the order of about 9:8. Compression of gasket 100 causes the projections 104 to be deformed to sealingly fill the spaces between leads 118 and simultaneously causing the cross section of the groove 106 to have the same size and shape as the cross section of a corresponding lead 118.

Figure 3:
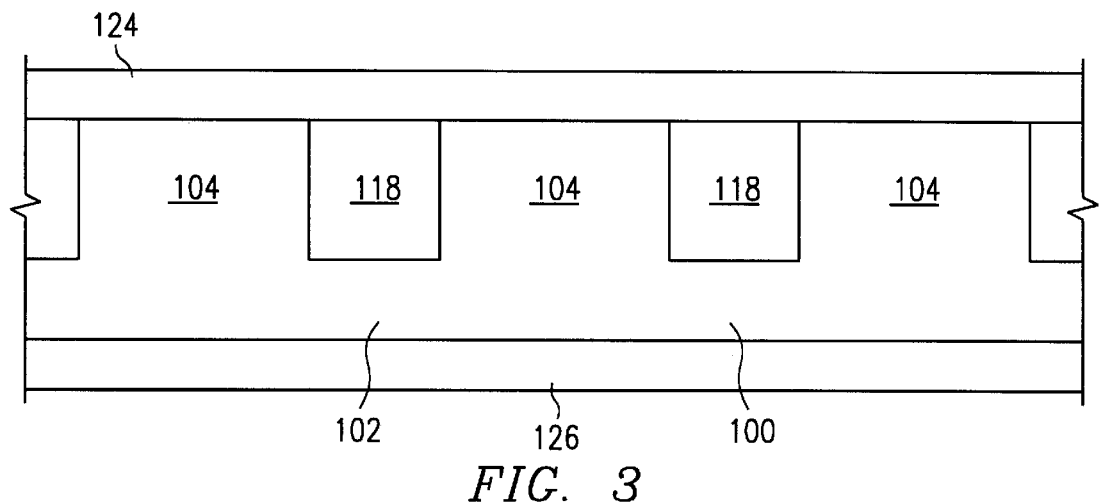
FIG. 3 is an enlarged partial view of the gasket of FIG. 1 in a compressed state.

For example, prior to injecting an encapsulation material into the mold cavity, a first plate 124 is spaced from first side surface 121 of the lead frame and a second plate 126 is spaced from a second side surface 122 of the lead frame. At this point, the gasket is in an uncompressed state. With further reference to FIG. 3, plates 124 and 126 may be brought into contact with opposing sides of gasket 100 and the lead frame. Gasket 100 is compressed between plates 124 and 126 so that the gasket material is deformed to fill the spaces between leads 118.

The lead frame preferably has a constant pitch. That is, the space between any two leads is always the same. However, in certain circumstances (e.g., due to manufacturing tolerances), the space between leads 118 may vary. Preferably, therefore, each projection 104 has a width which is just slightly narrower than the narrowest space between any two adjacent leads 118. Similarly, each lead preferably has the same width. However, the width of the leads may vary. Therefore, the width of each groove 106 is slightly greater than the width of the widest lead. These dimensions ensure that all leads 118 will fit into respective grooves 106 and that each projection 104 will fit into a corresponding space between two leads.

If the pitch and/or width of leads 118 varies, then there will be a worst case in which the difference between a width of one of the projections and the corresponding space between leads is greatest. The difference between depth "d" of groove 106 and thickness "t" of leads 118 is preferably such that compression of gasket 100 between plates 124 and 126 will deform the worst case projection to cause it to seal the corresponding space between leads. This will ensure that all projections are deformed to sealingly fill the respective spaces between leads. In the spaces between leads which are not the worst case, compression of gasket 100 may cause the projections 104 to deform and extend longitudinally beyond the limits of the intermediate portions of the leads 118. This longitudinal deformation is acceptable.

According to one feature, in the uncompressed state, the second ends 112 of tapered portions 108 of projections 104 are coextensive with the first side surface 121 the lead frame when leads 118 are fully inserted into grooves 106. However, the second ends 112 may be located above or below first side surface 121.

Figure 5:
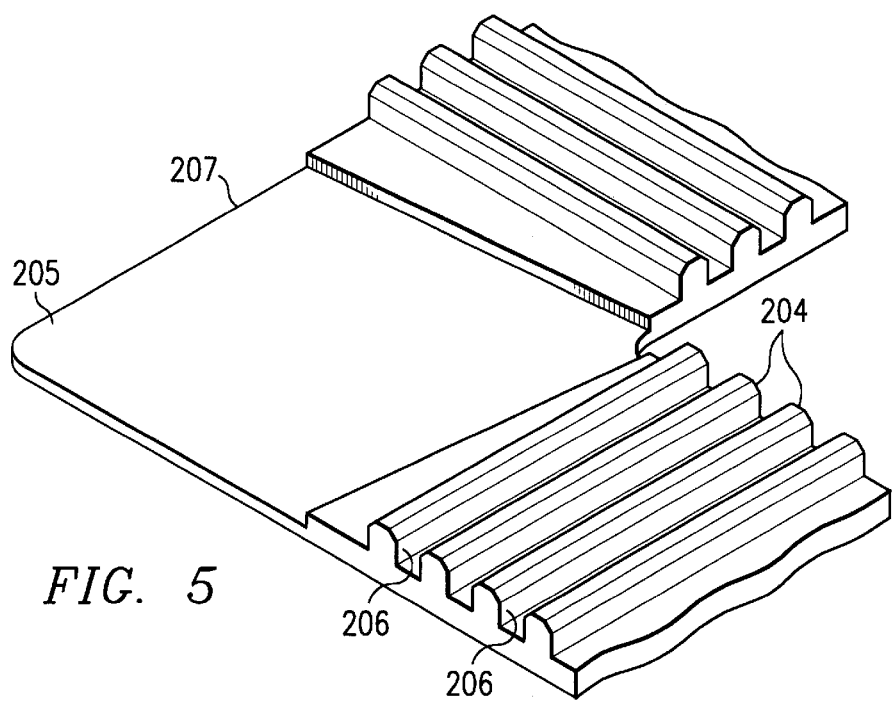
FIG. 5 is an enlarged partial view of the gasket of FIG. 4 in the area designated as circle 5 in FIG. 4.

According to an alternative aspect, and as shown in FIG. 4, gasket 200 is formed in a shape which corresponds to the shape of a lead frame (not shown) to which gasket 200 is coupled for encapsulation. The lead frame may be rectangular. Therefore, gasket 200 has a rectangular shape. Preferably, the dimensions of gasket 200 correspond to the lead frame so that the gasket coextends with the intermediate portions of the leads of the lead frame. As shown in the enlarged view of FIG. 5, the features of projections 204 and grooves 206 are similar to that described above. However, the gasket may also have four corner portions 205 which correspond to the shape of the four corners of the lead frame. One of the corner portions 205 may have a stepped portion 207 which provides a gap between the gasket and an encapsulation plate after the gasket 200 is compressed. This gap provides access into the mold cavity to allow an encapsulation material to be injected into the mold cavity.

According to a feature of the present invention, and as seen in FIGS. 2 and 3, a system is provided for encapsulating an integrated circuit chip package. The package may include, for example, an integrated circuit chip and a lead frame coupled to the chip. The system includes first and second encapsulation plates and one or more gaskets as described above. The gasket or gaskets are coupled to the lead frame. The plates and the gaskets cooperate to provide a mold cavity into which may be injected an encapsulation material.

According to a second embodiment a system of gaskets is provided. If the gasket is of the continuous, straight type, then a plurality of strips of gasket material are provided. A first of the plurality of strips has a plurality of first projections corresponding to a first predetermined lead pitch. A second of the plurality of strips has a plurality of projections corresponding to a second predetermined lead pitch. Preferably, a number of strips which corresponds to the number of different lead pitches which are commercially available. Each strip has an alternating groove and projection arrangement which corresponds to one of the commercially available lead pitches. If the gaskets are of the type which correspond in shape and dimension to the lead frame, then a plurality of gaskets is provided which correspond to a plurality of lead frames of different shape, dimension and lead pitch.

According to a third embodiment of the present invention, a method of encapsulating an integrated circuit chip package is provided. Preferably, the package includes an integrated circuit chip and a lead frame. A gasket is preformed to have one of the shapes discussed above. For example, the gasket can be formed to correspond to the shape, dimension and pitch of the lead frame or the gasket may be formed as a straight strip which corresponds only to the pitch of the lead frame.

The gasket is coupled to the lead frame. In the case of a straight gasket, strips corresponding in length to the sides of the lead frame are either preformed or cut from a preformed continuous strip. The strips are snapped onto the intermediate portions of the leads. With some lead frames, the corner portions have no leads. In this situation, corner portions of gasket material can be coupled to the corner portions of the lead frame to prevent the escape of encapsulation material via the corner portions of the lead frame. One corner portion preferably includes a stepped portion to provide access to the mold cavity, at the injection gate, after the gaskets are compressed. Alternatively, conventional metal dambars may be provided at the corner portions of the lead frame and the gasket strips are only provided between the corner portions of the lead frame. In the case of a gasket which corresponds to the lead frame shape and dimension, the gasket is simply snapped into place.

The gasket and lead frame are compressed between two encapsulation plates to form a mold cavity. Then, an encapsulation material is injected into the mold cavity and allowed to cure. Once the encapsulation material has cured, the gasket or gaskets are removed to completed the encapsulated package.

The present invention has thus been described in connection with the preferred embodiments, which are intended as examples only. It will be appreciated by those having ordinary skill in the relevant art that modifications may be made to these embodiments without departing from the scope and spirit of the invention as defined by the appended claims.

What is claimed is:

1. A system for encapsulating an integrated circuit chip package having a lead frame having at least one lead, the system comprising:
   a lead frame having at least one lead;
   a first plate;
   a second plate spaced from the first plate, the lead frame sealingly disposable between said first and second plates, said first and second plates in combination forming a mold cavity; and
   a gasket couplable to said lead frame to form a portion of a boundary of the mold cavity, said gasket comprising a compressible strip having at least one groove corresponding to each of said at least one lead for receiving the at least one lead therein;
   each said groove having a depth and width when said gasket is in the uncompressed state dimensioned greater than said lead for encapsulation corresponding to said groove;
   said groove, in a compressed state, sealingly engaging said at least one lead.

2. The system of claim 1, wherein when the strip is in a compressed state, portions of the strip between grooves prevent fluid flow between the mold cavity and an exterior of the mold cavity.

3. The system of claim 1, wherein the lead frame has a predetermined number of sides and the strip has a number of sides corresponding to said number of sides of the lead frame.

4. The system of claim 1, wherein the strip is substantially equal in length to one of the sides of the lead frame.

5. The system of claim 2, wherein the lead frame has a predetermined number of sides and the strip has a number of sides corresponding to the number of sides of the lead frame.

6. The system of claim 2, wherein the lead frame has a predetermined number of sides and the strip has a number of sides corresponding to the number of sides of the lead frame.

7. The system of claim 1 wherein said gasket has a shape and dimensions corresponding to a shape and dimensions of the lead frame.

8. The system of claim 2 wherein said gasket has a shape and dimensions corresponding to a shape and dimensions of the lead frame.

9. The system of claim 3 wherein said gasket has a shape and dimensions corresponding to a shape and dimensions of the lead frame.

10. The system of claim 4 wherein said gasket has a shape and dimensions corresponding to a shape and dimensions of the lead frame.

11. The system of claim 5 wherein said gasket has a shape and dimensions corresponding to a shape and dimensions of the lead frame.

12. The system of claim 6 wherein said gasket has a shape and dimensions corresponding to a shape and dimensions of the lead frame.

* * * * *